(12) United States Patent
Umeo et al.

(10) Patent No.: US 7,408,446 B2
(45) Date of Patent: Aug. 5, 2008

(54) BURGLAR ALARM DEVICE FOR VEHICLE

(75) Inventors: Yoshifumi Umeo, Hiroshima (JP);
Akihiro Furuzawa, Hiroshima (JP);
Yasushi Hamada, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 273 days.

(21) Appl. No.: 11/231,967

(22) Filed: Sep. 22, 2005

(65) Prior Publication Data
US 2006/0087412 A1 Apr. 27, 2006

(30) Foreign Application Priority Data

| Oct. 7, 2004 | (JP) | ............................. 2004-294842 |
| Mar. 31, 2005 | (JP) | ............................. 2005-101077 |
| Mar. 31, 2005 | (JP) | ............................. 2005-101078 |

(51) Int. Cl.
*B60R 25/10* (2006.01)

(52) U.S. Cl. .............................. 340/426.26; 340/425.1; 340/426.1; 340/426.24; 307/10.2; 307/9.1; 180/287

(58) Field of Classification Search .................. 340/429, 340/425.5, 426.1, 426.24, 426.26, 540; 307/10.2, 307/9.1; 180/287; 116/33
See application file for complete search history.

(56) References Cited

U.S. PATENT DOCUMENTS

| 4,638,294 A | 1/1987 | Sakurai et al. |
| 6,198,385 B1 | 3/2001 | Kani et al. |
| 6,445,988 B1* | 9/2002 | Breed et al. ..................... 701/45 |
| 6,857,656 B2* | 2/2005 | Yasui .......................... 280/735 |
| 6,932,769 B2* | 8/2005 | Griffin et al. ................. 600/437 |
| 2003/0011471 A1* | 1/2003 | Goings ........................ 340/426 |

FOREIGN PATENT DOCUMENTS

| DE | 28 17 492 A1 | 10/1979 |
| DE | 3003887 A1 | 8/1981 |
| DE | 4417710 | 9/1995 |
| DE | 19706898 A1 | 9/1997 |
| EP | 0 541 565 A | 5/1993 |

OTHER PUBLICATIONS

Kent Swanley, "Using Doppler Movement Detection In Car-Alarm Applications", Electronics World, Nexus Media Communication, vol. 100; No. 1702, Sep. 1, 1994; p. 750, Germany.
European Search Report Application No. EP 05 02 0834 dated Dec. 22, 2005.

* cited by examiner

*Primary Examiner*—George A Bugg
*Assistant Examiner*—Travis R Hunnings
(74) *Attorney, Agent, or Firm*—Studebaker & Brackett PC; Donald R. Studebaker

(57) ABSTRACT

There is provided in back of the instrument panel the motion sensor that transmits the radio wave continuously or periodically and receive the radio wave reflected in the vehicle compartment. Also, there is provided the burglar horn that executes specified alarming when a specified change in the reflected radio wave received by the motion sensor occurs. Herein, the motion sensor transmits the radio wave toward the instrument panel. Thereby, the stable burglar alarm operation can be performed.

14 Claims, 8 Drawing Sheets

BURGLAR ALARM DEVICE FOR VEHICLE

BACKGROUND OF THE INVENTION

The present invention relates to a burglar alarm device for a vehicle, and in particular to the burglar alarm device that is suitable for a type of vehicle whose part of roof or entire roof are selectively opened and closed or detachable, or to a type of vehicle whose roof is fixed and whose part of roof or entire roof are made of a radio-wave transmittable material.

Conventionally, the burglar alarm device for a vehicle is known, which comprises the motion sensor (the sensor to detect an unauthorized person intruding into the vehicle compartment) to transmit ultrasonic waves or infrared rays continuously or periodically and receive such waves reflected in the vehicle compartment, and the warning means for executing alarming when a specified change in the reflected waves received by the motion sensor occurs in the alert state after the door lock or the like.

In the above-described burglar alarm device for a vehicle, it is also known that the motion sensor comprised of the ultrasonic-wave generator and the ultrasonic-wave receiver is provided at the center of the front header of the vehicle so as to detect the unauthorized person intruding into the vehicle compartment (for example, see U.S. Pat. No. 6,198,385).

Meanwhile, recently the radio-wave type of motion sensor using the radio wave that a non-metal member transmits has been developed. Accordingly, the use of this type of motion sensor can improve the burglar alarm function, for example, by hiding the motion sensor in the front header of the vehicle that is covered with a trim of the non-metal member.

Herein, in the case where the radio-wave motion sensor is, for example, provided at the center of the front header of the so-called open car whose roof is selectively opened and closed, the radio wave that has been transmitted by the motion sensor in a rearward and downward direction of the vehicle and then reflects at metal members, such as a seat frame of a seat cushion or a floor panel, goes upward beyond a roof position of the vehicle when the roof is in the open state. Also, even when the roof of the open car is closed, if the roof is made of the non-metal member, i.e., the radio-wave transmittable material, the reflected radio wave may go upward passing through and beyond the closed roof of the vehicle. In this case, there is a concern that the motion sensor would mistakenly detect other objects, such as birds or person's hands existing above the roof, as the above-described authorized person intruding into the vehicle compartment. Namely, the above-described radio wave going upward beyond the roof of the vehicle would cause a detection error by the motion sensor. Accordingly, there may be a problem of deterioration of the detection of the motion sensor.

In the case where the motion sensor is provided inside the side door, meanwhile, there may be a problem that the motion sensor would receive damages from the impact of the door opening/closing or from the water intruding into the door.

SUMMARY OF THE INVENTION

The present invention has been devised in view of the above-described problems, and an object of the present invention is to provide the burglar alarm device for a vehicle that can perform a stable burglar alarm function.

The present invention is a burglar alarm device for a vehicle, comprising a motion sensor operative to transmit a radio wave and receive the radio wave reflected in a vehicle compartment, an alarming device operative to execute alarming, and a burglar alarm control device operative to operate the alarming device for the alarming when a specified change in the reflected radio wave received by the motion sensor occurs, wherein the motion sensor is disposed so as to be located in back of an instrument panel of the vehicle and to transmit the radio wave in a forward direction of the vehicle and toward the instrument panel.

Accordingly, since it uses the radio wave that other members than the metal member transmit, the motion sensor can be disposed at a portion covered with the non-metal member in back of the instrument panel. And, the motion sensor transmits the radio wave continuously or periodically into the vehicle compartment from the rear portion in back of the instrument panel in the alert state. The radio wave transmitted by the motion sensor is reflected by the metal members located in the instrument panel or around there. The radio wave that has been reflected by the metal members mainly goes back toward the motion sensor, so that the motion sensor can receive the reflected radio wave. Thus, when the specified change in the reflected radio wave received by the motion sensor occurs, the unauthorized person intruding is detected via the motion sensor and the burglar alarm control device, and the alarming device is operated for alarming. Herein, the motion senor transmits the radio wave in the forward direction and toward the instrument panel, and mainly receives the radio wave that has been reflected by the metal members located in the instrument panel or around there. Accordingly, the amount of the radio wave that has been reflected in the vehicle compartment and goes upward beyond the roof can be reduced properly, and the detection error by the motion sensor with this radio wave going upward beyond the roof, i.e., the erroneous detecting of birds or person's hands existing above the roof, can be prevented. As a result, the stable burglar alarm operation can be performed.

Herein, the above-described burglar alarm device is suitable for a type of vehicle whose part of roof or entire roof are selectively opened and closed or detachable, or to a type of vehicle whose roof is fixed and whose part of roof or entire roof are made of the radio-wave transmittable material.

According to a preferred embodiment of the present invention, the motion sensor is disposed so as to transmit the radio wave in a direction that is substantially perpendicular to a dash panel of the vehicle. Thereby, the radio wave transmitted by the motion sensor is reflected substantially perpendicularly by the dash panel that partitions the vehicle compartment from an engine room, and then the reflected radio wave is received by the motion sensor.

Also, according to another preferred embodiment of the present invention, the motion sensor is disposed so as to transmit the radio wave in a direction of a portion below the instrument panel. Thereby, the radio wave transmitted by the motion sensor is mainly reflected diffusely by a metal member such as a floor panel below the instrument panel and the metal members in the instrument panel, and then the reflected radio wave is received by the motion sensor.

Further, according to another preferred embodiment of the present invention, the motion is disposed so as to transmit the radio wave in a forward and downward direction of the vehicle. Thereby, the radio wave transmitted by the motion sensor is mainly reflected diffusely by the dash panel and the floor panel, and then the reflected radio wave is received by the motion sensor.

According to the above-described preferred embodiments, the amount of the reflected radio wave going upward beyond the roof can be reduced properly, and the detection error by the motion sensor with this radio wave going upward beyond the roof can be prevented properly. As a result, the proper burglar alarm can be ensured.

According to further another preferred embodiment of the present invention, the motion sensor is disposed at a lower portion in the vehicle compartment with the radio wave thereof that is transmitted obliquely downward with respect to a horizontal face, and there is further provided a radio-wave reflecting member operative to reflect at least part of the radio wave transmitted by the motion sensor in a direction that is off the roof of the vehicle.

Accordingly, since the motion sensor is disposed at the lower portion in the vehicle compartment with the radio wave thereof that is transmitted obliquely downward with respect to the horizontal face, the most intensive radio wave located at the center of the generation direction from the motion sensor can be prevented from directly going toward the roof of the vehicle. Thereby, the detection error by the motion sensor with this radio wave going upward beyond the roof can be prevented properly. Further, since any particular reflecting plates to shut off the direct radio wave toward the roof may not necessary, the detecting area is not limited improperly. Also, part of the radio wave reflected by the radio-wave reflecting member can reach another area where the direct radio wave does not reach, thereby enlarging the detecting area further.

Further, it is preferable that above-described radio-wave reflecting member includes a curved reflecting face that projects upward. Thereby, the radio wave reflected by the curved reflecting face can spread widely in the vehicle compartment, thereby improving the detection accuracy of the motion sensor.

Further, it is preferable that there is further provided a shut-off plate behind the motion sensor to prevent the radio wave from being transmitted rearward, and the shut-off plate and the motion sensor are integrally fixed to each other. Thereby, the attachment of the burglar alarm device to the vehicle can be facilitated.

Herein, the curved reflecting face of the radio-wave reflecting member is preferably constituted such that a curvature of a part thereof operative to reflect the radio wave located at a center of the generation direction is greater than that of the other part thereof. Thereby, the intensive radio wave located at the center of the generation direction is reflected diffusely the most by the part of the reflecting member having the greatest curvature, so that the intense of the radio wave can be reduced properly. Accordingly, the detection error by the motion sensor with this radio wave going upward beyond the roof can be prevented properly.

According to further another preferred embodiment of the present invention, the motion sensor is disposed at the lower portion in the vehicle compartment with the radio wave thereof that is transmitted obliquely downward with respect to the horizontal face and toward a metal panel that is disposed substantially laterally at a lower portion of the vehicle, and there are further provided a trim member to cover the motion sensor and the metal panel, and a reflecting member that is provided at the trim member so as to reflect downward at least part of the radio wave reflected by the metal panel.

Accordingly, since the reflecting member prevents the intensive radio wave from going upward, the detection error by the motion sensor with this radio wave going upward beyond the roof can be prevented properly, without reducing intensity of the radio wave transmitted by the motion sensor. Further, since any particular reflecting plates to shut off the direct radio wave toward the roof may not necessary, the detecting area is not limited improperly. Also, part of the radio wave reflected by the radio-wave reflecting member can reach another area where the direct radio wave does not reach, thereby enlarging the detecting area further.

Herein, it is preferable that the reflecting member is constituted so as to reflect the radio wave toward the instrument panel. Thereby, the authorized person intruding into the vehicle compartment who makes an access to the area around the instrument panel, where many valuable devices, such as audio devises of a CD player or navigation system, are installed, can be detected effectively. Accordingly, the burglar alarm function can be improved properly.

Further, it is preferable that the reflecting member is disposed so as to be located in substantially parallel to the radio wave transmitted directly by the motion sensor. Thereby, the amount of the direct radio wave transmitted by the motion sensor that may be shut off by the reflecting member can be reduced as much as possible, so that the non-detecting area can be reduced in the vehicle compartment.

According to further another preferred embodiment of the present invention, the motion sensor is provided at a console portion between front seats of the vehicle. Thus, the motion sensor is provided at the console portion between front seats that projects upward from the vehicle floor. Thereby, since the motion sensor is provided at the existing member of the console portion, any additional projecting members for attaching the motion sensor may not be necessary. As a result, the cost reduction can be attained and the efficient burglar alarming can be attained.

According to further another preferred embodiment of the present invention, the motion sensor is disposed in back of the front seat, there are further provided a driving operational device of the vehicle on a side of the vehicle and a non-metal member of the front seat between the motion sensor and the driving operational device, and the motion sensor is constituted so as to transmit the radio wave toward the driving operational device. In general, the driving operational device of the vehicle is to be an object for the burglar alarm detection by the motion sensor. Therefore, in order to provide the detecting area wide enough to cover both the instrument panel and the driving operational device which is provided on a side of the vehicle, such detecting area becomes considerably wide, and thereby a rather expensive motion sensor that can cover such a wide area may be necessary. According to the above-described embodiment, however, the motion sensor is disposed in back of the front seat so that part of the radio wave transmitted by the motion sensor can go through the non-metal members at the console portion or the front seat and reach the driving operational device of the vehicle. The unauthorized person intruding into the vehicle compartment will thus contact the radio wave transmitted toward the driving operational device of the vehicle, and then the burglar alarming is performed properly. Thereby, since both the instrument panel and the driving operational device may be detected without using the rather expensive motion sensor with the wider detecting area, the burglar alarming can be performed surely with lower costs.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. These embodiments exemplify devices that are applied to an open-car type of vehicle with a soft top that can be opened at need (hereinafter, referred to as "open car"). However, the burglar alarm device according to the present invention is applicable to a type of vehicle whose part of roof or entire roof are selectively opened and closed or detachable (including so-called T-bar-roof car, canvas-top car etc.), or a type of vehicle whose roof is fixed and whose part of roof or entire roof are made of a radio-wave transmittable material (including so-called sun-roof car, glass-roof car etc.). Also, the followings just exemplify preferred embodiments and do not intend to limit the application or the scope of use of the present invention.

Embodiment 1

Figure 1:
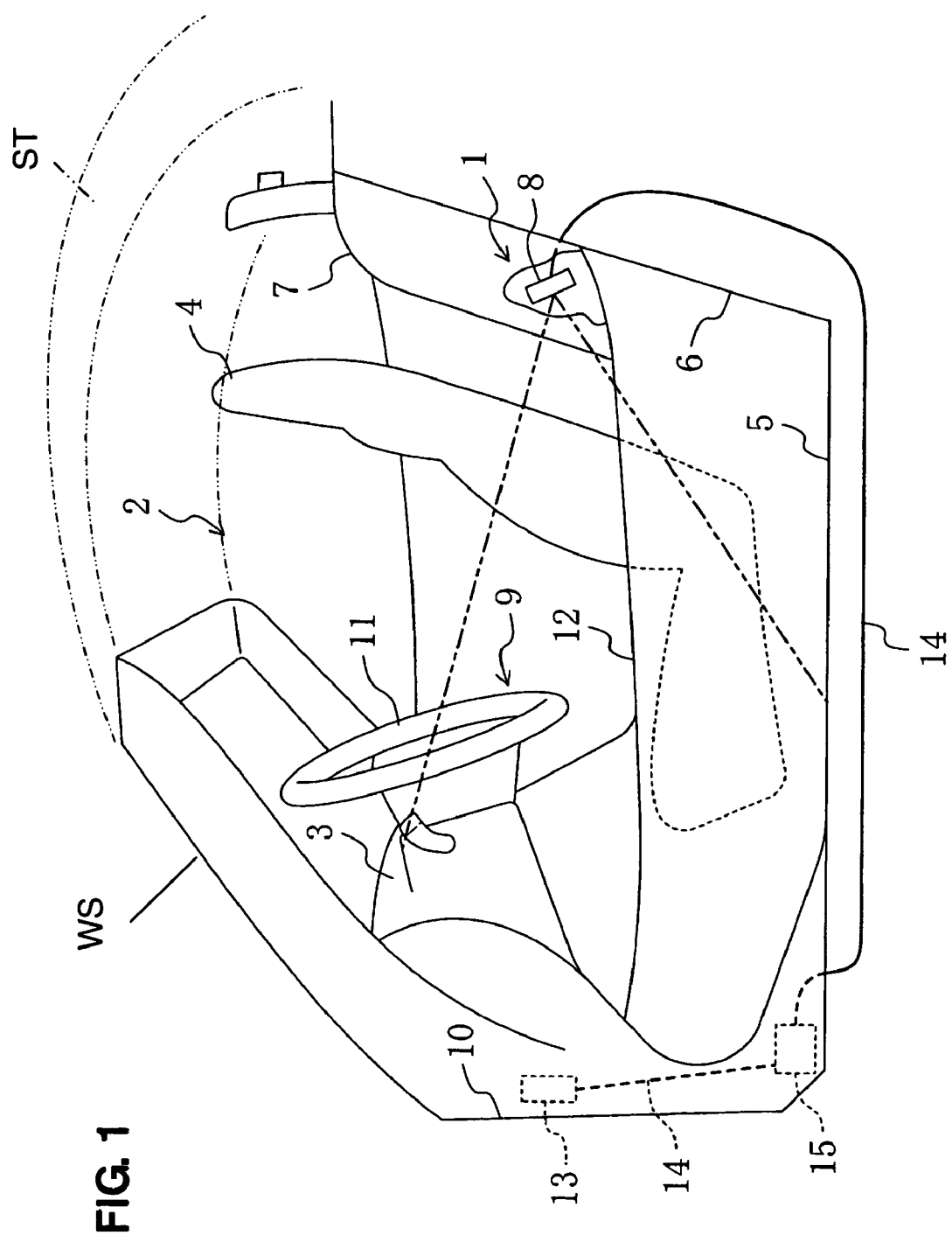
FIG. 1 is a side view illustrating a partially-cutout vehicle compartment of an open car equipped with a burglar alarm device for a vehicle according to the first embodiment of the present invention.
Figure 2:
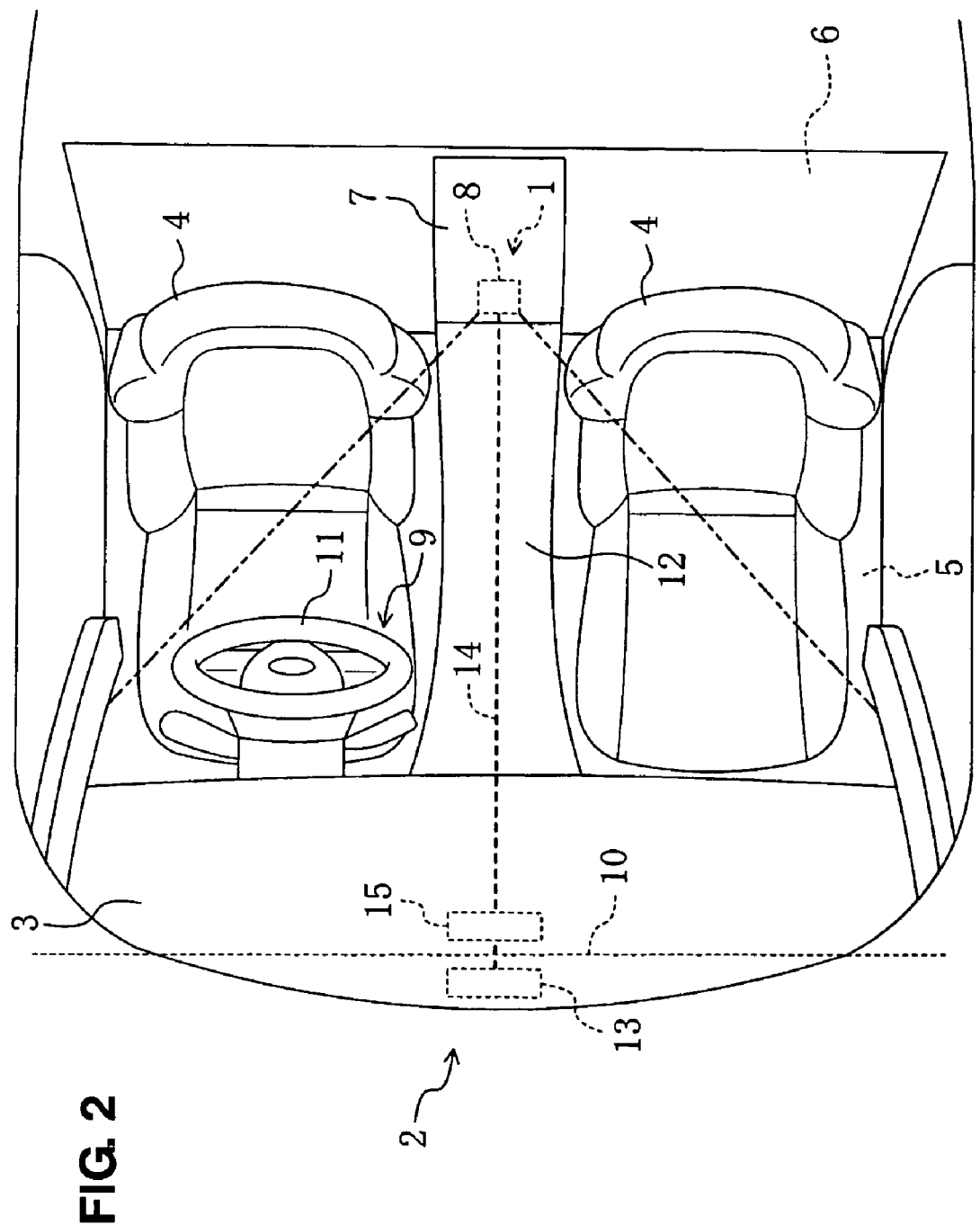
FIG. 2 is a plan view illustrating the vehicle compartment of the open car equipped with the burglar alarm device for a vehicle according to the first embodiment of the present invention.

FIGS. 1 and 2 illustrate a vehicle compartment of an open car 2 in which a burglar alarm device for a vehicle 1 according to the first embodiment of the present invention. The open car 2, with a steering wheel disposed on a right side of the car, includes a row of front seats 4 that are provided in back of an instrument panel 3. A rear end of a floor panel 5 below the front seats 4 is coupled to a kick-up portion 6 that rises behind the front seats 4. There is provided a rear console portion 7 between the front seats 4 before the kick-up portion 6 so as to project forward from the kick-up portion 6. The rear console portion 7 is located between the front seats 4 and projects upward from the floor panel 5 (a floor tunnel portion 12). And, the rear console portion 7 rises upward and rearward beyond the floor tunnel portion 12 at a location before the kick-up portion 6 and behind the front seats 4. In front of the instrument panel 3 is provided a dash panel 10 substantially perpendicularly to the floor panel 5, which partitions the vehicle compartment from an engine room. Herein, ST denotes a soft top of the open car to be selectively opened and closed, and WS denotes a front windshield.

The above-described rear console portion 7 is made of resin material, and a motion sensor 8 of the above-described burglar alarm device for a vehicle 1 is disposed in the rear console portion 7.

The burglar alarm device for a vehicle 1 comprises a burglar horn 13 as an alarm device to execute specified alarming when a specified change in the reflected radio wave occurs. The motion sensor 8 and the burglar horn 13 are coupled via a harness 14 to a CPU 15 as a burglar alarm control device, and the burglar alarm device for a vehicle 1 is thus not viewed from outside. The CPU 15 operates the burglar horn 13 for the alarming.

The above-described motion sensor 8 comprises a radio-wave transmitter and a radio-wave receiver (both not illustrated) and it is disposed so as to transmit the radio wave toward the instrument panel 3.

The disposition of the motion sensor 8 can be set different ways so as to have different angles. For example, as illustrated in FIG. 1, the motion sensor 8 is disposed so as to incline slightly downward (for example, by 35 degrees). Thus, the motion sensor 8 can detect an unauthorized person intruding into the vehicle compartment, with a wide detecting area covering the instrument panel 3 and a vehicle driving operational device 9 (for example, a steering wheel 11, operational pedals, etc.), as illustrated by two-dotted broken lines in FIGS. 1 and 2.

Namely, since the motion sensor 8 is disposed in the rear console portion 7, the radio wave transmitted by the motion sensor 8 reaches the area of the vehicle driving operational device 9, passing through the non-metal (radio-wave transmittable) members that constitute the rear console portion 7 and the front seats 4.

Next, operation of the burglar alarm device for a vehicle 1 according to the present embodiment will be described.

At first, the motion sensor is OFF in a non-alert state. Then, the device gets in the alert state, for example, in 20 seconds after vehicle doors have been locked by a driver or the like. In this alert state, the motion sensor 8 disposed in back of the instrument panel 3 transmits the radio wave continuously or periodically into the vehicle compartment. Namely, after it turns ON, the motion sensor 8 can transmit the radio wave continuously or it can transmit the radio wave for several seconds every seconds.

The above-described radio wave is reflected by metal members around the instrument panel 3 and goes back in a rearward direction of the vehicle, then the motion sensor 8 receives the radio wave reflected.

If no unauthorized person intruding into the vehicle compartment exists, no change in the reflected radio wave occurs. Accordingly, the motion sensor 8 detects no unauthorized person intruding, and the CPU does not operate the burglar horn 13.

Meanwhile, if the unauthorized person intrudes into the vehicle compartment and then moves a baggage in the front seats 4, touches meters at the instrument panel 3, sits in the front seats, or operates the vehicle driving operational device 9, the reflected radio wave in a stable state becomes unstable and a change in the reflected radio wave occurs. This change is detected by the motion sensor 8. This detection signal is supplied to the CPU 15, and the alarming is executed by the burglar horn 13 operated by the CPU 15.

Thus, according to the burglar alarm device for a vehicle 1 of the present embodiment, in the alert state, the motion sensor 8 disposed in back of the instrument panel 3 transmits the radio wave continuously or periodically toward the instrument panel 3, the specified change in the reflected radio wave is detected by the motion sensor 8, and the specified alarming is executed by the burglar horn 13. Herein, the motion senor 8 receives the radio wave that has been mainly reflected by the metal members located in the instrument panel 3 or around there. Accordingly, the amount of the radio wave that has been reflected in the vehicle compartment and that goes upward can be reduced, and the detection error by the motion sensor 8 with this radio wave going upward beyond the roof, i.e., the erroneous detecting of birds or person's hands existing above the roof, can be prevented. As a result, the proper burglar alarming for the instrument panel 3 can be performed.

Also, in the present embodiment, the motion sensor 8 is provided in the rear console portion 7 between the front seats 4. Thus, the motion sensor 8 can be located in the existing rear console portion 7 so as not to be viewed from outside, and thereby the burglar alarming can be performed more surely.

Further, in the present embodiment, the motion sensor 8 is disposed in back of the front seats 4 so that part of the radio wave transmitted by the motion sensor 8 can go through the non-metal member of the front seats 4 and reach the vehicle driving operational device 9. Thereby, since both the instrument panel 3 and the driving operational device 9 can be detected without using the expensive motion sensor with the wider detecting area, the burglar alarming can be performed surely with lower costs.

Herein, the direction of the radio wave transmitted by the motion sensor 8 may include the following manners.

Namely, the motion sensor 8 may be disposed so as to transmit the radio wave in a direction that is substantially perpendicular to the dash panel 10, in a direction of a portion below the instrument panel 3, or in a forward and downward direction of the vehicle. In these cases, the amount of the reflected radio wave going upward beyond the roof can be reduced as well, and the detection error by the motion sensor 8 with this radio wave going upward beyond the roof can be prevented as well. As a result, the further proper burglar alarm can be ensured.

Also, the area of the radio wave transmitted by the motion sensor 8 is adjustable according to the sensitivity of the motion sensor 8.

The burglar alarm device can be applied to the open car with the steering wheel disposed at the left side of the car.

Embodiment 2

A burglar alarm device for a vehicle 100 according to the second embodiment of the present invention will be described referring to FIGS. 3 through 6. Herein, the same structures and components as those of the first embodiment are denoted by the same reference numerals in the figures, and detailed descriptions on those will be omitted.

The burglar alarm device for a vehicle 100 of the second embodiment is characterized in that a motion sensor 80 is disposed at a lower portion in the vehicle compartment with the radio wave thereof that is transmitted obliquely downward with respect to the horizontal face, and there is further provided a radio-wave reflecting member 20 that reflects at least part of the radio wave transmitted by the motion sensor 80 in a direction that is off the roof of the vehicle.

Figure 3:
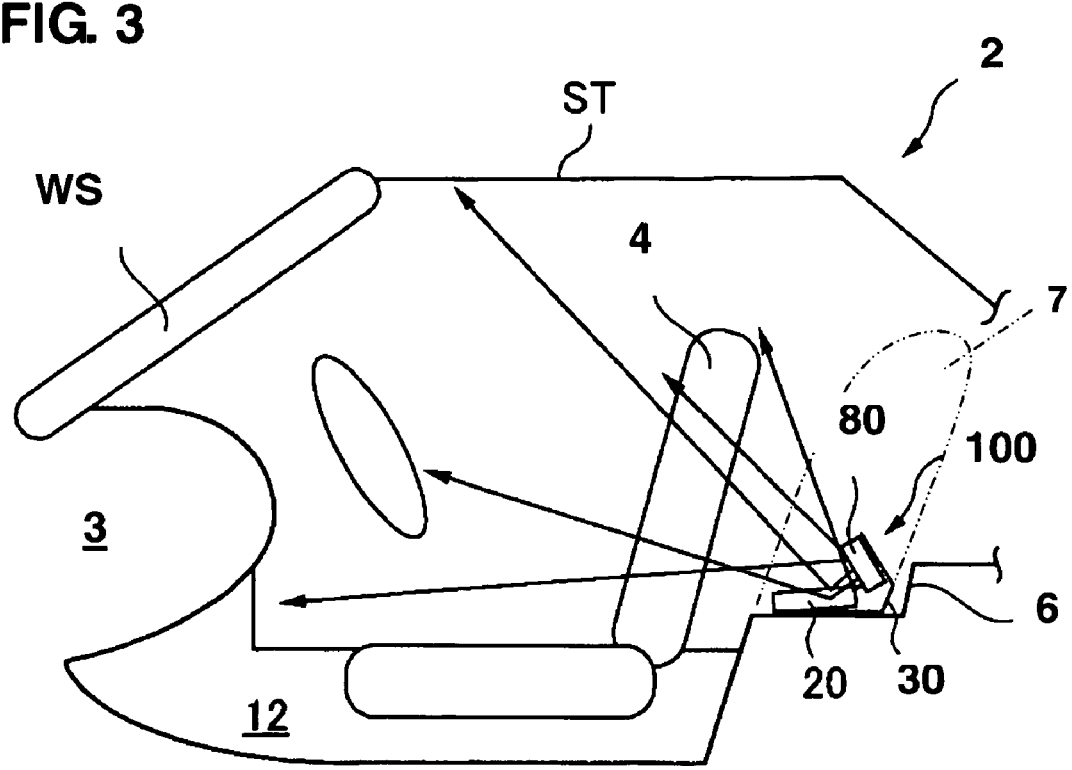
FIG. 3 is a schematic view illustrating a state of the vehicle in which a burglar alarm device for a vehicle according to the second embodiment of the present invention is installed.
Figure 4:
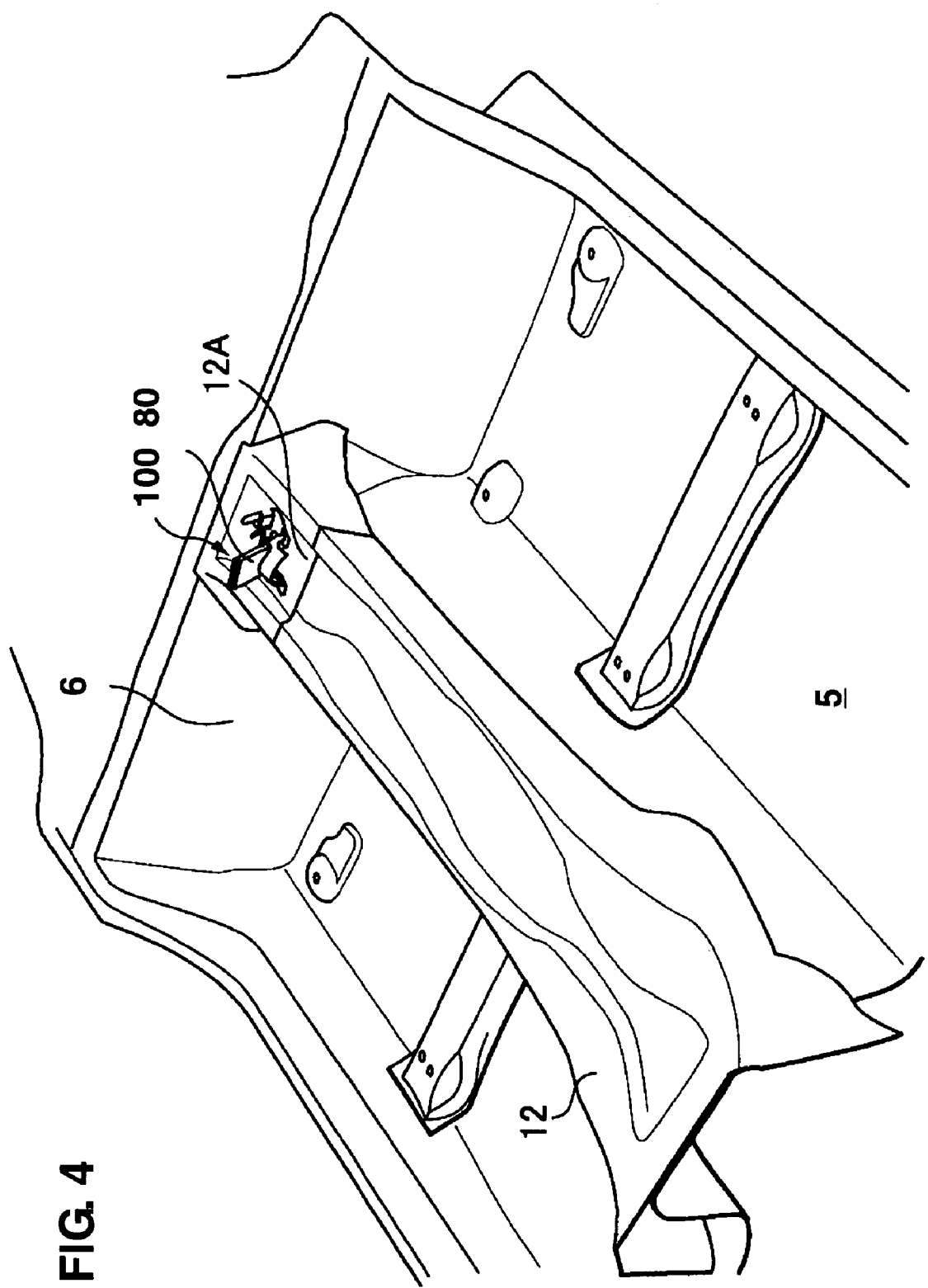
FIG. 4 is a partially-schematic perspective view illustrating an installment position of the burglar alarm device for a vehicle of FIG. 3.

As illustrated in FIGS. 3 and 4, the floor tunnel portion 12 extends between the front seats 4, the driver's seat and assistant seat, of the open car 2. The floor tunnel portion 12 includes a web plate portion 12A, which is made of a metal plate, at the top. The motion sensor 80 is disposed in the rear console portion 7 at a rear portion on the web plate portion 12A that is close to the kick-up portion 6. Namely, the motion sensor 80 is located at the rear and lower portion in the vehicle compartment that is partitioned by the front windshield WS, the kick-up portion 6, an upper edge portion of A-pillars (not illustrated) holding the front windshield WS, and the floor panel 5. The locating of the motion sensor 80 at the rear portion in the vehicle compartment can provide the radio wave that covers the wide detecting area, meanwhile the locating of the motion sensor 80 at the lower portion in the vehicle compartment can prevent the intensive radio wave from reaching the soft top ST.

Herein, words "front", "rear", "left", and "right" used in this description mean each directions relative to a longitudinal direction of the vehicle (i.e., a vehicle advancing direction) basically.

Figure 5:
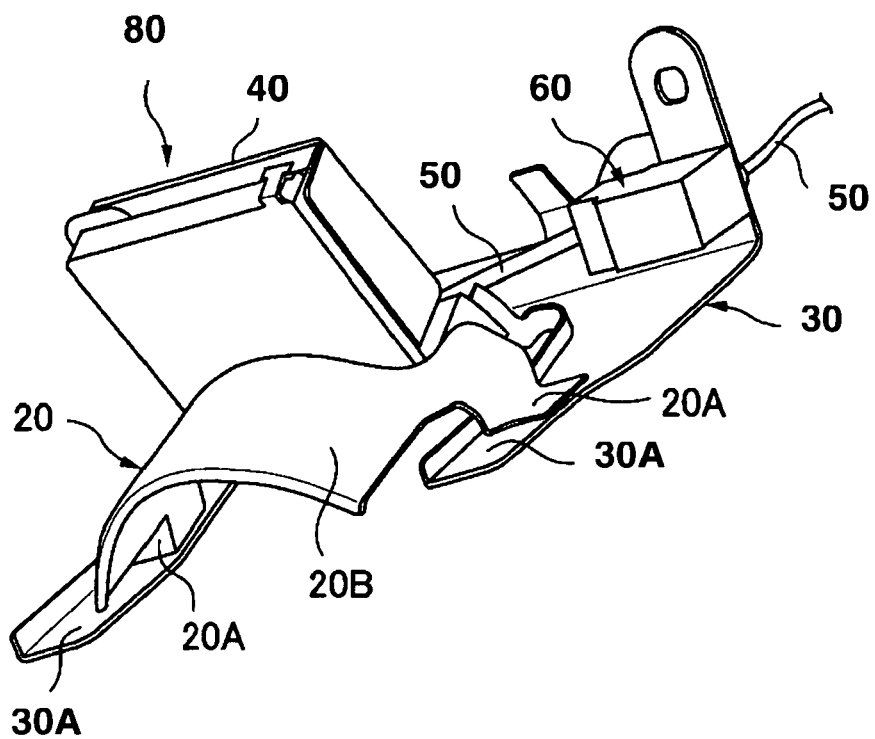
FIG. 5 is a left side view illustrating a motion sensor, a radio-wave reflecting member, and an attaching bracket of the burglar alarm device for a vehicle of FIG. 3.
Figure 6:
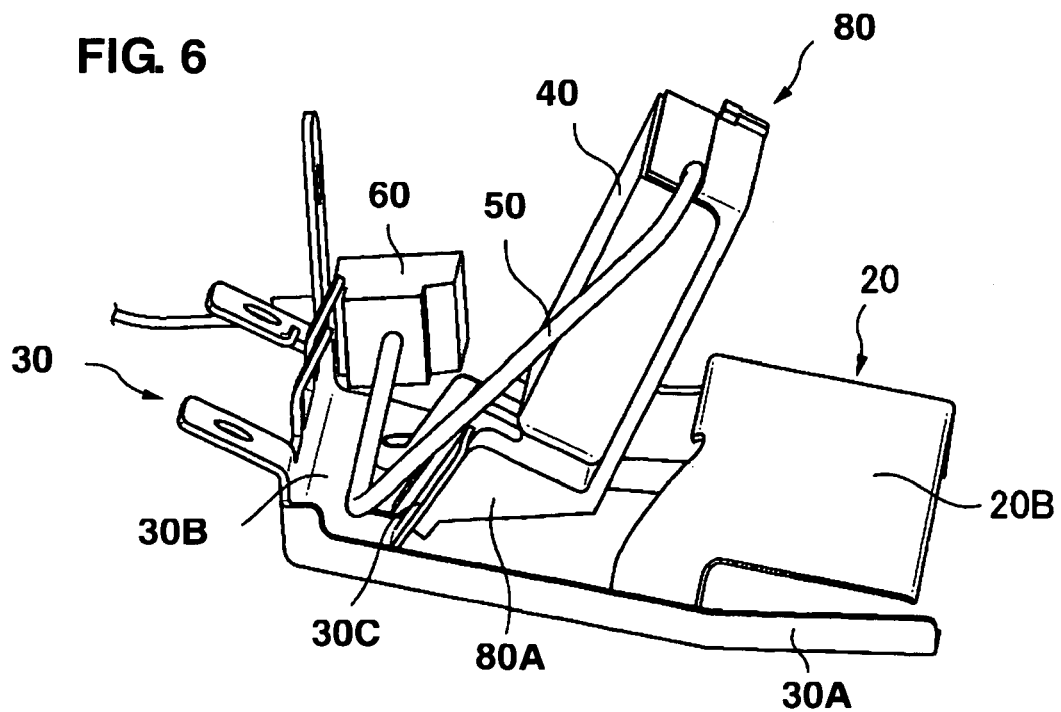
FIG. 6 is a right side view illustrating the motion sensor, the radio-wave reflecting member, and the attaching bracket of the burglar alarm device for a vehicle of FIG. 3.

FIGS. 5 and 6 illustrate the motion sensor 80, an attaching bracket 30 that attaches this sensor 80 to the floor panel portion 12, and the radio-wave reflecting member 20 that is attached to the attaching bracket 30 and reflects the radio wave that has been transmitted by the motion sensor 80.

The attaching bracket 30 comprises a pair of leg portions 30A that extend in the longitudinal direction of the open car 2 respectively, and a connecting portion 30B that interconnects respective rear portions of the leg portions 30A. At the leg portions 30A and the connecting portion 30B are formed attaching holes (not illustrated). The attaching bracket 30 is attached to the floor tunnel portion 12 by inserting bolts (not illustrated) into these attaching holes formed at the leg portions 30A and the connecting portion 30B and then by applying nuts (not illustrated) to the bolts, thereby fastening the leg portions 30A of the attaching bracket 30 to the web plate portion 12A.

The attachment of the bracket 30 to the floor tunnel 12 may be done via adhesive or welding. Hereinafter, a word "attach" simply means any manners of attaching separate members by fastening via bolt, nut, screw or the like or by fixing via adhesive, welding or the like.

The attaching bracket 30 comprises an attaching portion 30C that extends upward from the connecting portion 30B. The motion sensor 80 is attached to the attaching bracket 30 with a lower attaching portion 80A to be attached to the attaching portion 30C.

The motion sensor 80 has a known sensor constitution. Accordingly, descriptions of its sensor constitution and operation will be omitted here.

The motion sensor 80 is disposed with the radio wave thereof that is transmitted obliquely downward with respect to a horizontal face. Thereby, the most intensive radio wave (direct wave) located at the center of the generation direction from the motion sensor 80 can be prevented from directly going toward the soft top ST. Herein, although the radio wave located outside the center of the generation direction is generally weak compared with the above-described intensive radio wave located at the center, even such radio wave located outside might go through the soft top ST in the case where the used radio wave itself has a strong intensity. Accordingly, it is preferable that the motion sensor 80 is disposed with the radio wave thereof that is transmitted obliquely downward with respect to the horizontal face so that the direct wave from the motion sensor 80 is not directed rearward (i.e., toward the soft top ST) from the upper edge portion of an A pillar (not illustrated) of the open car 2.

To a back face of the motion sensor 80 is attached a shut-off plate 40 to prevent the radio wave from being transmitted rearward. Accordingly, the rearward radio wave (side rove) from the motion sensor 80 is shut off.

The motion sensor 80 is, like the first embodiment, coupled to the burglar alarm control device (not illustrated) via electric cables 50 and a connector 60, and the burglar alarm control device is coupled to the alarm device, such as the burglar horn or the like, via wire or wireless system.

To the attaching bracket 30 is also attached the radio-wave reflecting member 20 to reflect the radio wave transmitted by the motion sensor 80. The radio-wave reflecting member 20 can be made of any metals, for example, iron.

The radio-wave reflecting member 20 comprises a pair of attaching legs 20A that are respectively attached to the leg portions 30A of the attaching bracket 30, and an upward-projecting curved face member 20B that extends between the attaching legs 20A. The shape of a curved face of the upward-projecting curved face member 20B is configured so that the intensity of the reflected radio wave toward the soft top ST can be reduced and part of the reflected radio can reach another area in the vehicle compartment where the direct radio wave does not reach. Thereby, the amount of the reflected radio wave going through the soft top ST can be reduced or eliminated, the detection error can be prevented, and the detecting area can be enlarged.

Herein, the upward-projecting curved face member 20B of the motion sensor 80 may be constituted such that a curvature of the curved face is uniform over the area between the leg portions 30A. However, in the present embodiment, the curvature of a part (center portion) of the curved face operative to reflect the radio wave located at the center of the generation direction is greater than that of the other part (side portion) thereof. Thereby, the amount of the reflected radio wave going toward the soft top ST per the unit area is diffused and the intensity of the radio wave is reduced. Namely, even if the power of the radio wave transmitted by the motion sensor 80 is not changed, the curvature of a main part of the reflecting curved face of the upward-projecting curved face member 20B is designed properly, and thereby the intensity of the reflected radio wave toward the soft top ST can be adjusted appropriately. This curvature of the main part of the reflecting curved face of the upward-projecting curved face member 20B may be properly designed based on a calculation or an experimentation so that any reflected radio wave does not reach the soft top ST.

The motion sensor 80, attaching bracket 30, radio-wave reflecting member 20, which are attached to the web plate portion 12A of the floor tunnel portion 12, are covered with a trim, i.e., a garnish (not illustrated). The intensity of the radio wave reflected by the upward-projecting curved face member 20B toward the soft top ST may be adjusted by this garnish.

Next, operation of the burglar alarm device for a vehicle 100 according to the present embodiment will be described.

Like the above-described first embodiment, the burglar alarm device 100 gets in the alert state, for example, after vehicle doors have been locked. In this alert state, the motion sensor 80 transmits the radio wave continuously (or periodically).

Part of the radio wave transmitted by the motion sensor 80 is reflected by the upward-projecting curved face member 20B of the radio-wave reflecting member 20. The radio wave reflected by the main part (center portion) of the upward-projecting curved face member 20B is diffused more greatly than that reflected by other part of that (side portion). Accordingly, the radio wave that can go through the soft top ST is reduced or eliminated, thereby preventing the detection error properly. Meanwhile, the radio wave reflected by the side portion of the upward-projecting curved face member 20B reaches the area in the vehicle compartment where the direct radio wave of the motion sensor 80 does not reach. Thus, the detecting area is enlarged.

Part of the radio wave transmitted by the motion sensor 80 spreads in the vehicle compartment, not being reflected by the radio-wave reflecting member 20.

The radio wave that has been transmitted by the motion sensor 80 is received by the motion sensor 80 again, and the received signal is supplied to the burglar alarm control device (not illustrated). When the specified change in the reflected radio wave received by the motion sensor 80 has occurred, it is determined that the unauthorized person has intruded into the vehicle compartment, and then operates the alarming device (not illustrated). The alarming device, for example, generates alarming sound to warn the car owner or the like of the intruder.

Herein, the following modifications are also applicable.

Although the motion sensor 80 is attached on the web metal-plate portion 12A at the lower portion in the vehicle compartment in the above-described embodiment, it may be attached on the floor panel 5 that is made of metal and located at the lower portion in the vehicle compartment as well.

Although the radio-wave reflecting member 20 is made of a separate member in the above-described embodiment, it may be formed by a vehicle component, for example, a part of the web plate member 12A that projects upward with a curved shape.

Embodiment 3

A burglar alarm device for a vehicle 100' according to the third embodiment of the present invention will be described referring to FIGS. 7 through 10. Herein, the same structures and components as those of the previous embodiments are denoted by the same reference numerals in the figures, and detailed descriptions on those will be omitted. The burglar alarm device for a vehicle 100' of the third embodiment is characterized in that the motion sensor 80 is disposed at the lower portion in the vehicle compartment with the radio wave thereof that is transmitted obliquely downward with respect to the horizontal face and toward a metal panel 12a that is disposed substantially laterally at a lower portion of the vehicle, and there are further provided a garnish member 70, as a trim member, to cover the motion sensor 80 and the metal panel 12a, and a reflecting member 20' that is provided at the garnish member 70, as the trim member, so as to reflect downward at least part of the radio wave reflected by the metal panel 12a.

Figure 7:
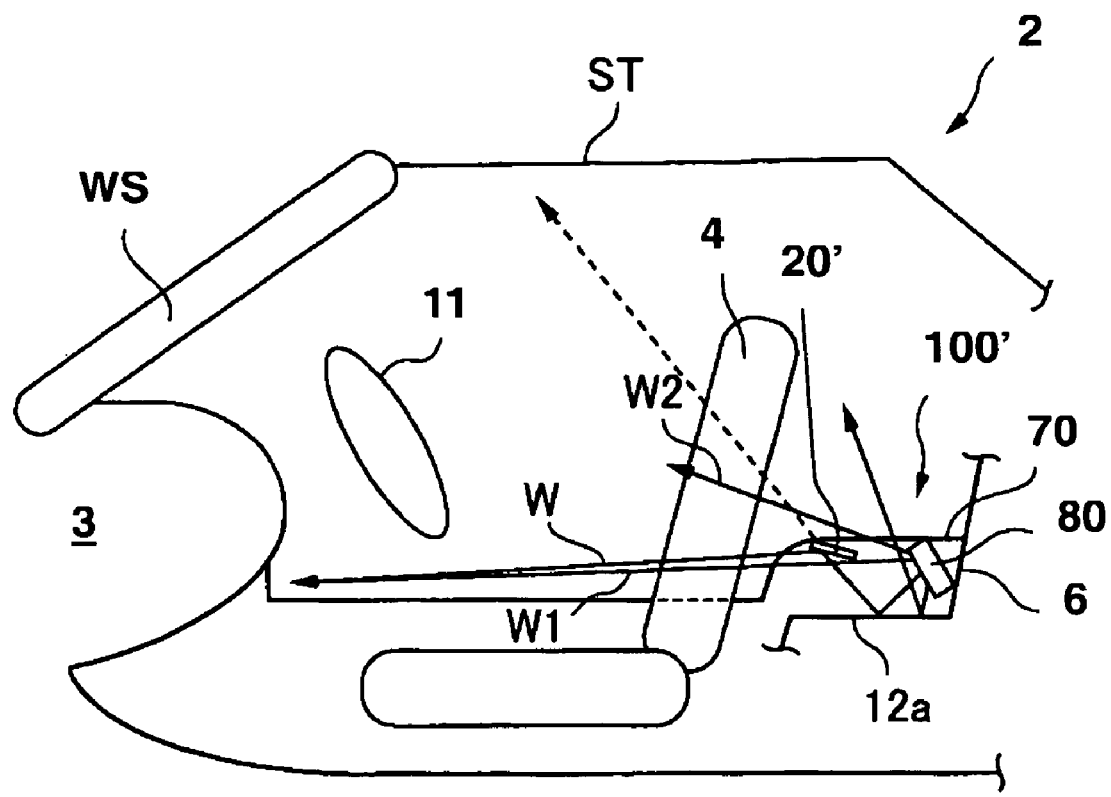
FIG. 7 is a schematic view illustrating a state of the vehicle in which a burglar alarm device for a vehicle according to the third embodiment of the present invention is installed.
Figure 8:
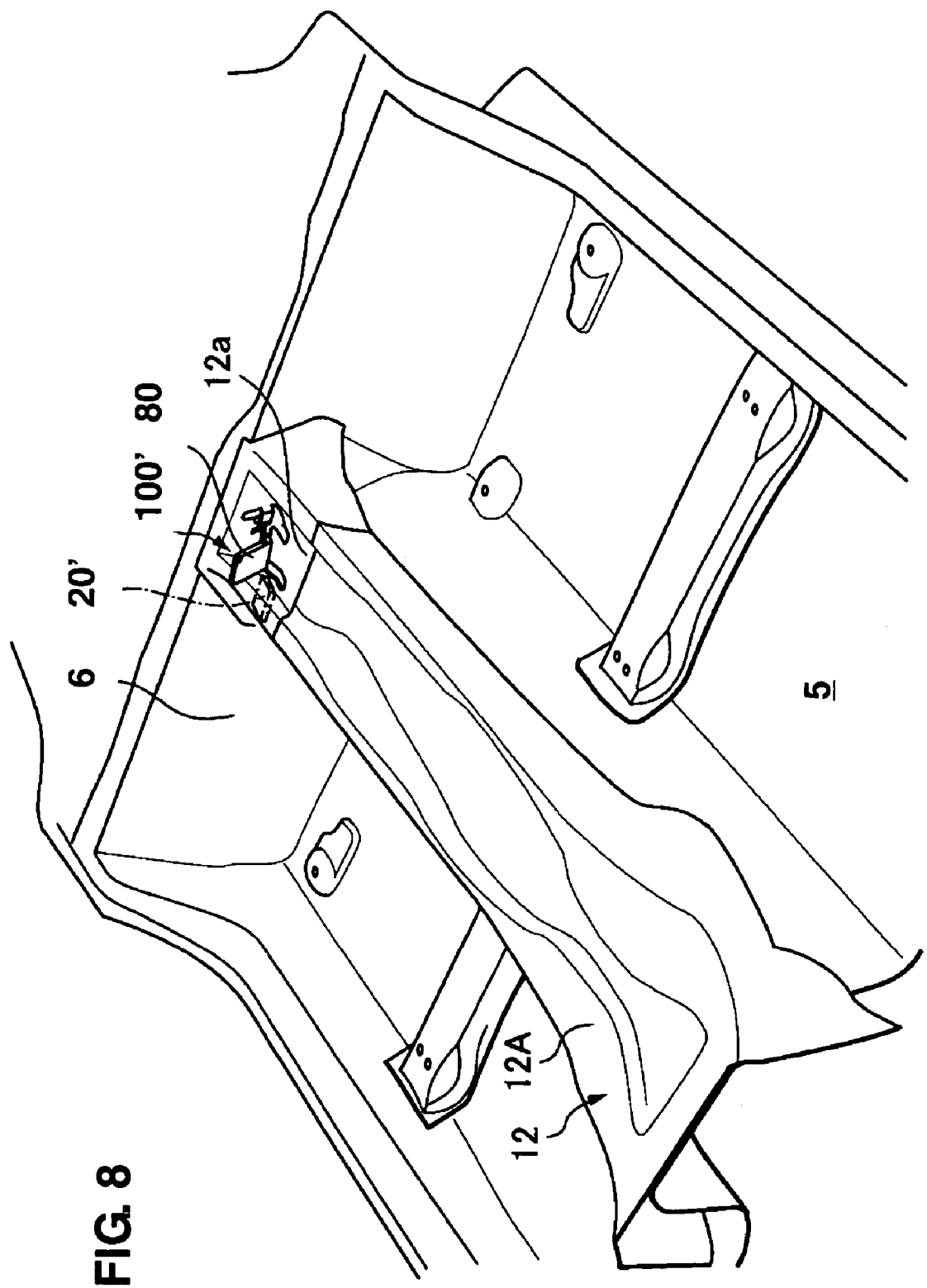
FIG. 8 is a partially-schematic perspective view illustrating an installment position of the burglar alarm device for a vehicle of FIG. 7.

As illustrated in FIGS. 7 and 8, the floor tunnel portion 12 extends between the front seats 4, the driver's seat and assistant seat, of the open car 2. The floor tunnel portion 12 includes the web plate portion 12A at the top. The motion sensor 80 is disposed on the rear console panel 12a that is made of a metal plate at a rear portion on the web plate portion 12A that is close to the kick-up portion 6. Namely, the motion sensor 80 is located at the rear and lower portion in the vehicle compartment that is partitioned by the front windshield WS, the kick-up portion 6, an upper edge portion of A-pillars (not illustrated) holding the front windshield WS, and the floor panel 5. The locating of the motion sensor 80 at the rear portion in the vehicle compartment can provide the radio wave that covers the wide detecting area, meanwhile the locating of the motion sensor 80 at the lower portion in the vehicle compartment can prevent the intensive radio wave from reaching the soft top ST.

Figure 9:
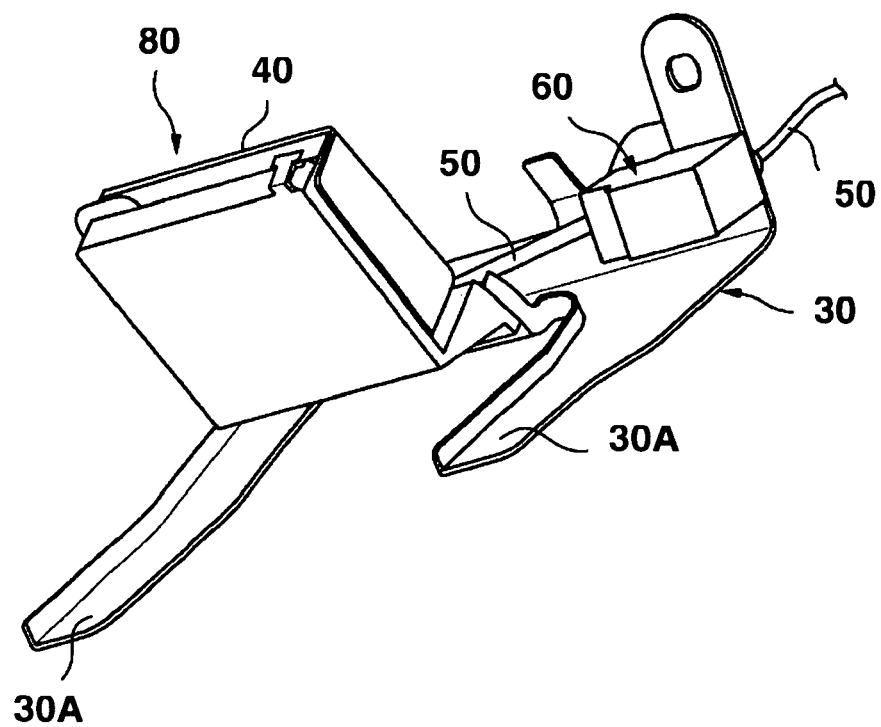
FIG. 9 is a left side view illustrating a motion sensor and an attaching bracket of the burglar alarm device for a vehicle of FIG. 7.
Figure 10:
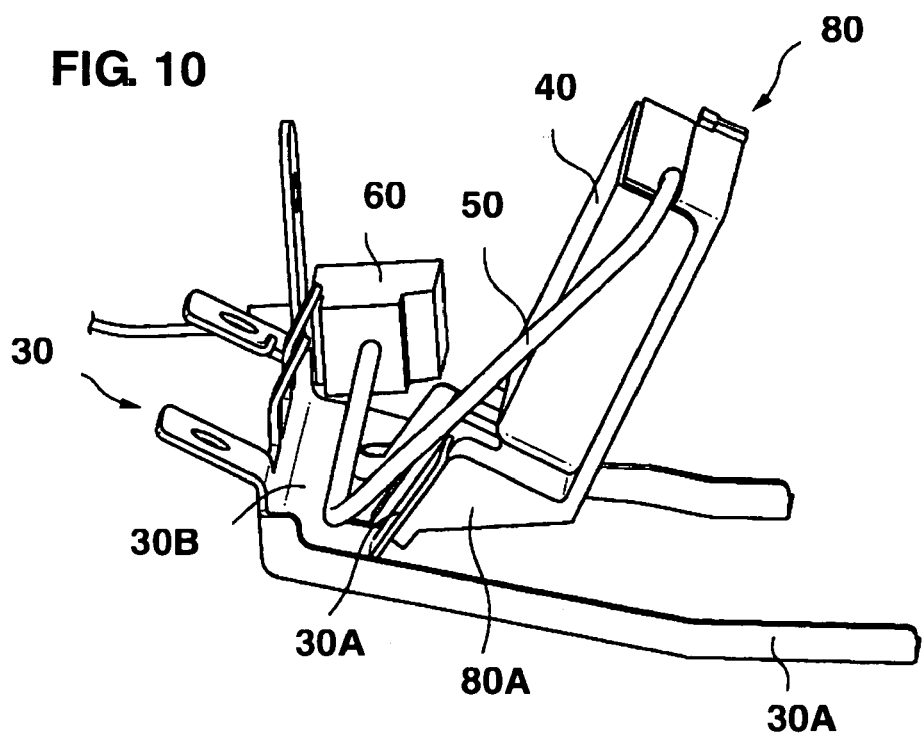
FIG. 10 is a perspective view illustrating the motion sensor and the attaching bracket of the burglar alarm device for a vehicle of FIG. 7.

FIGS. 9 and 10 illustrate the motion sensor 80 and the attaching bracket 30 that attaches this sensor 80 to the rear console panel 12a. Herein, the motion sensor 80 is substantially the same as that in the second embodiment described above, and therefore descriptions of its specific structures are omitted here. Also, the other components that are the same as those in the second embodiment are denoted by the same reference numerals, and specific descriptions on those are omitted here.

The motion sensor 80 is disposed so that the radio wave is transmitted obliquely downward with respect to the horizontal face, toward the rear console panel 12*a*, Thereby, the most intensive radio wave (direct wave) located at the center of the generation direction from the motion sensor 80 can be prevented from directly going toward the soft top ST. Herein, although the radio wave located outside the center of the generation direction is generally weak compared with the above-described intensive radio wave located at the center, even such radio wave located outside might go through the soft top ST in the case where the used radio wave itself has the strong intensity. Accordingly, it is preferable that the motion sensor 80 is disposed with the radio wave thereof that is transmitted obliquely downward with respect to the horizontal face so that the direct wave from the motion sensor 80 is not directed rearward (i.e., toward the soft top ST) from the upper edge portion of an A pillar (not illustrated) of the open car 2.

The motion sensor 80 attached to the rear console panel 12*a* of the floor tunnel portion 12 and the attaching bracket 30 are covered with the garnish member 70 as the trim member. The garnish 70 extends forward from the kick-up portion 6 at a specified level so that it does not interfere with the motion sensor 80 and the attaching bracket 30. Then, it goes down after passing the rear console panel 12*a* and then extends to the instrument panel 3 along the floor tunnel portion 12.

Part of the radio wave that has been transmitted by the motion sensor 80 obliquely downward with respect to the horizontal face is reflected by the rear console panel 12*a*. And, at a lower face of the garnish 70 is provided a reflecting member 20' to reflect downward part of the radio wave that has been reflected by the rear console panel 12*a*. The reflecting member 20' prevents the intensive radio wave from going upward, and thereby the detection error by the motion sensor 80 with this radio wave going upward beyond the roof can be prevented properly. Further, part of the radio wave reflected by the reflecting member 20' can reach another area where the direct radio wave does not reach, and thereby the detecting area can be enlarged.

It is preferable that the reflecting member 20' is constituted so that the reflected radio wave W1 goes and reaches a specified area. In the present embodiment, the reflected radio wave is constituted to go toward the instrument panel 3, where many valuable devices, such as audio devises of a CD player or navigation system are installed. Accordingly, the burglar alarm function for the particular security area can be improved.

Further, the reflecting member 20' is disposed so as to be located in substantially parallel to the radio wave transmitted directly from the motion sensor 80. Thereby, the amount of the direct radio wave transmitted by the motion sensor 80 that may be shut off by the reflecting member 20' can be reduced as much as possible, so that an non-detecting area can be reduced in the vehicle compartment. Further, the motion sensor 80 and the reflecting member 20' are located at a certain proper distance in the longitudinal direction of the vehicle. Thereby, it becomes possible that the direct radio wave W2 from the motion sensor 80 is directed toward the steeling wheel 11 of the open car 2. Accordingly, the security area to be detected by the motion sensor 80 around the steering wheel 11 can be properly maintained regardless of the disposition of the reflecting member 20'.

The reflecting member 20' is fixed to the lower face of the garnish 70 by an adhesive material or an adhesive sheet. It is preferable that a proper treatment for fixing the reflecting member 20' is executed at the lower face of the garnish 70 so that the reflecting member 20' can be easily located in the right position. Also, the reflecting member 20' may be formed integrally with the garnish 70.

Herein, since the motion sensor 80 is covered with the garnish 70, the use of the radio wave that can go through the garnish, not the ultrasonic wave, is preferable. In the case where the ultrasonic wave is used, an exit hole for the wave may be needed to be formed at the garnish 70.

Next, operation of the burglar alarm device for a vehicle 100' according to the present embodiment will be described.

Like the above-described embodiments, the burglar alarm device 100' gets in the alert state, for example, after vehicle doors have been locked. In this alert state, the motion sensor 80 transmits the radio wave continuously (or periodically).

Part of the radio wave transmitted by the motion sensor 80 is reflected upward by the rear console panel 12*a*. Part of the radio wave reflected by the rear console panel 12*a* is reflected by the reflecting member 20' again downward and toward the instrument panel 3. Accordingly, since the radio wave W reflected by the reflecting member 20' is directed downward, the intensive radio wave transmitted by the motion sensor 80 is prevented from going toward the soft top ST. Thereby, the detection error can be properly prevented. Meanwhile, since the radio wave W is directed to the instrument panel 3, the burglar alarm function for the particular security area to be detected can be improved.

The part of the intensive radio wave W1 from the motion sensor 80 spreads in the vehicle compartment, without being prevented by the rear console panel 12*a* and the reflecting member 20'. The part of the radio wave W2 from the motion sensor 80 goes beside the reflecting member 20' toward the steering wheel 11 of the open car 2.

The radio wave that has been transmitted by the motion sensor 80 is received by the motion sensor 80 again, and the received signal is supplied to the burglar alarm control device (not illustrated). When the specified change in the reflected radio wave received by the motion sensor 80 has occurred, it is determined that the unauthorized person has intruded into the vehicle compartment, and then operates the alarming device (not illustrated). The alarming device, for example, generates alarming sound to warn the car owner or the like of the intruder.

Herein, the following modifications are also applicable.

Although the motion sensor 80 is attached on the web metal-plate portion 12A at the lower portion in the vehicle compartment in the above-described embodiment, it may be attached on the floor panel 5 that is made of metal and located at the lower portion in the vehicle compartment as well.

Although the reflecting member 20' is attached to the garnish 70 in the above-described embodiment, it may be attached to another vehicle component than the garnish 70.

Any other modifications and improvements can be applied within the scope of a sprit of the present invention.

What is claimed is:

1. A burglar alarm device for a vehicle, comprising:
   a motion sensor operative to transmit a radio wave and receive the radio wave reflected in a vehicle compartment;
   an alarming device operative to execute alarming; and
   a burglar alarm control device operative to operate said alarming device for the alarming when a specified change in the reflected radio wave received by said motion sensor occurs, wherein said motion sensor is disposed so as to be located in the vehicle compartment in back of an instrument panel of the vehicle and to transmit the radio wave in a forward direction of the vehicle and toward the instrument panel, said motion sensor is provided at a rear console portion provided between front seats of the vehicle and in back of the front seats so that part of the radio wave transmitted by the motion sensor can go through a non-metal member of the front seat, the vehicle is a type of vehicle whose part of roof or entire roof are selectively opened and closed or detachable, or a type of vehicle whose roof is fixed and whose part of roof or entire roof are made of a radio-wave transmittable material, the radio wave of said motion sensor is transmitted obliquely downward with respect to a horizontal face, and there is further provided a radio-wave reflecting member operative to reflect at least part of the radio wave transmitted by said motion sensor in a direction that is off the roof of the vehicle.

2. The burglar alarm device for a vehicle of claim 1, wherein said radio-wave reflecting member includes a curved reflecting face that projects upward.

3. The burglar alarm device for a vehicle of claim 1, wherein there is further provided a shut-off plate behind said motion sensor to prevent the radio wave from being transmitted rearward, and said shut-off plate and said motion sensor are integrally fixed to each other.

4. The burglar alarm device for a vehicle of claim 2, wherein said curved reflecting face of the radio-wave reflecting member is constituted such that a curvature of a part thereof operative to reflect the radio wave located at a center of the generation direction is greater than that of the other part thereof.

5. The burglar alarm device for a vehicle of claim 4, wherein said curved reflecting face of the radio-wave reflecting member is constituted such that a curvature of a part thereof operative to reflect the radio wave located at a center of the generation direction is greater than that of the other part thereof.

6. A burglar alarm device for a vehicle, comprising:
  a motion sensor operative to transmit a radio wave and receive the radio wave reflected in a vehicle compartment;
  an alarming device operative to execute alarming; and
  a burglar alarm control device operative to operate said alarming device for the alarming when a specified change in the reflected radio wave received by said motion sensor occurs,
  wherein said motion sensor is disposed so as to be located in the vehicle compartment in back of an instrument panel of the vehicle and to transmit the radio wave in a forward direction of the vehicle and toward the instrument panel,
  said motion sensor is provided at a rear console portion provided between front seats of the vehicle and in back of the front seats so that part of the radio wave transmitted by the motion sensor can go through a non-metal member of the front seat,
  the vehicle is a type of vehicle whose part of roof or entire roof are selectively opened and closed or detachable, or a type of vehicle whose roof is fixed and whose part of roof or entire roof are made of a radio-wave transmittable material,
  said motion sensor is disposed at a lower portion in the vehicle compartment with the radio wave thereof that is transmitted obliquely downward with respect to a horizontal face and toward a metal panel that is disposed substantially laterally at a lower portion of the vehicle, and there are further provided a trim member to cover said motion sensor and said metal panel, and a reflecting member that is provided at said trim member so as to reflect downward at least part of the radio wave reflected by said metal panel.

7. The burglar alarm device for a vehicle of claim 6, wherein said reflecting member is constituted so as to reflect the radio wave toward the instrument panel.

8. The burglar alarm device for a vehicle of claim 6, wherein said reflecting member is disposed so as to be located in substantially parallel to the radio wave transmitted directly by said motion sensor.

9. A burglar alarm device for a vehicle, comprising:
  a motion sensor operative to transmit a radio wave and receive the radio wave reflected in a vehicle compartment;
  an alarming device operative to execute alarming; and
  a burglar alarm control device operative to operate said alarming device for the alarming when a specified change in the reflected radio wave received by said motion sensor occurs,
  wherein said motion sensor is disposed so as to be located in the vehicle compartment in back of an instrument panel of the vehicle and to transmit the radio wave in a forward direction of the vehicle and toward the instrument panel,
  wherein said motion sensor is disposed in back of the front seat, there are further provided a driving operational device of the vehicle on a side of the vehicle and a non-metal member of the front seat between said motion sensor and said driving operational device, and said motion sensor is constituted so as to transmit the radio wave toward said driving operational device.

10. A burglar alarm device for a vehicle including a roof that is made of a radio-wave transmittable material, comprising:
  a motion sensor operative to transmit a radio wave and receive the radio wave reflected in a vehicle compartment;
  an alarming device operative to execute alarming; and
  a burglar alarm control device operative to operate said alarming device for the alarming when a specified change in the reflected radio wave received by said motion sensor occurs,
  wherein said motion sensor is disposed at a lower portion in the vehicle compartment with the radio wave thereof that is transmitted obliquely downward with respect to a horizontal face, there is further provided a radio-wave reflecting member operative to reflect at least part of the radio wave transmitted by said motion sensor in a direction that is off the roof of the vehicle, said radio-wave reflecting member includes a curved reflecting face that projects upward, and said curved reflecting face of the radio-wave reflecting member is constituted such that a curvature of a part thereof operative to reflect the radio wave located at a center of the generation direction is greater than that of the other part thereof.

11. A burglar alarm device for a vehicle including a roof that is made of a radio-wave transmittable material, comprising:
  a motion sensor operative to transmit a radio wave and receive the radio wave reflected in a vehicle compartment;
  an alarming device operative to execute alarming; and a burglar alarm control device operative to operate said alarming device for the alarming when a specified change in the reflected radio wave received by said motion sensor occurs, wherein said motion sensor is provided at a console portion between front seats of the vehicle that is located in back of an instrument panel of the vehicle and behind the front seats, said motion sensor is disposed so as to transmit the radio wave toward the instrument panel and in a forward and downward direction of the vehicle, there are provided a driving operational device of the vehicle on a side of the vehicle and a non-metal member of the front seat between said motion sensor and said driving operational device, and said motion sensor is constituted so as to transmit the radio wave toward said driving operational device.

12. A burglar alarm device for a vehicle, comprising:

a motion sensor operative to transmit a radio wave and receive the radio wave reflected in a vehicle compartment;

an alarming device operative to execute alarming; and a burglar alarm control device operative to operate said alarming device for the alarming when a specified change in the reflected radio wave received by said motion sensor occurs, wherein said motion sensor is disposed so as to be located in the vehicle compartment in back of an instrument panel of the vehicle and to transmit the radio wave in a forward direction of the vehicle and obliquely downward with respect to a horizontal face, and there is further provided a radio-wave reflecting member operative to reflect at least part of the radio wave transmitted by said motion sensor in a direction that is off the roof of the vehicle.

13. The burglar alarm device for a vehicle of claim 12, wherein said radio-wave reflecting member includes a curved reflecting face that projects upward.

14. The burglar alarm device for a vehicle of claim 13, wherein said curved reflecting face of the radio-wave reflecting member is constituted such that a curvature of a part thereof operative to reflect the radio wave located at a center of the generation direction is greater than that of the other part thereof.

* * * * *